United States Patent [19]

Anthon

[11] Patent Number: 5,644,589
[45] Date of Patent: Jul. 1, 1997

[54] SOLID STATE LASER OPTIMIZED FOR MULTIMODE OPERATION

[75] Inventor: Douglas W. Anthon, Wheaton, Ill.

[73] Assignee: ATx Telecom Systems, Inc., Naperville, Ill.

[21] Appl. No.: 577,421

[22] Filed: Dec. 22, 1995

[51] Int. Cl.$^6$ .................................................. H01S 3/08
[52] U.S. Cl. ........................... 372/92; 372/93; 372/98; 372/97; 372/19; 372/6; 372/41
[58] Field of Search ........................ 372/92, 93, 98, 372/101, 106, 97, 108, 19, 6, 41, 21, 22

[56] References Cited

U.S. PATENT DOCUMENTS

| | | |
|---|---|---|
| 3,582,820 | 6/1971 | Salzer et al. . |
| 3,895,313 | 7/1975 | Seitz . |
| 4,354,272 | 10/1982 | Schwob et al. . |
| 5,331,652 | 7/1994 | Rapoport et al. . |
| 5,363,391 | 11/1994 | Matthews et al. ............... 372/21 |
| 5,381,427 | 1/1995 | Wedekind et al. ............... 372/19 |

OTHER PUBLICATIONS

Monolithic, unidirectional single–mode Nd:YAG ring laser, Thomas J. Kane and Robert I. Byer, Feb. 1985, vol. No. 2, Optics Letters.

On the production and use of the optical contact bond, R.N. Smartt and J.V. Ransay, Division of Physics, National Standards Laboratory, Apr. 20, 1964.

Monolithic integrated Nd:YAG laser, K. Wallmereth, 1990 Optical Society of America Full Date Not Available.

Requency stability and offset locking of a laser–diode–pumped Nd:YAG monolithic nonplanar ring oscillator, Thomas J. Kane, Alan C. Nilsson, and Robert L. Byer, Mar. 1987, vol. 12, No. 3, Optical Society of America.

Abramovici, "Minimal Nd: Yap Laser Configuration with Single Frequency Output," *Optics Communications*, vol. 61, No. 6, 401–404 (1987).

Anthon et al., "Diode–Pumped Erbium Glass Lasers," *SPIE*, vol. 1627 Solid State Lasers III pp. 8–12 (1992).

Aoki et al., "Stimulated Brillouin Scattering in a Long Single–Mode Fiber Excited with a Multimode Pump Laser," *J. Opt. Soc. Am. B*, vol. 5, No. 2, pp. 358–363 (1988).

Bennett et al., "in *Handbook of Optics*, Sec. 10, Polarization," pp. 112–115.

Dixon et al., "523–nm Composite–Cavity Internally–Doubled Close–Coupled LNP Cube Laser," *Conference on Lasers and Electro–Optics*, Anaheim, California, May 21–25, 1990.

Gapontsev et al., "Erbium Glass Lasers and Their Applications," CA vol. 099, No. 26, Sec 173, Abstract No. 221943.

Gapontsev et al., "Effective 1.054–1.54 μStimulated Emission Conversion," *JETP Letters*, vol. 18, pp. 251–253 (1973).

Gapontsev et al., "Erbium Glass Lasers and Their Applications," *Optics and Laser Technology*, Aug. 1982, pp. 189–196.

Gimlett et al., "Effects of Phase–to–Intensity Noise Conversion by Multiple Reflections on Gigabit–per–Second DFB Laser Transmission Systems," *Journal of Lightwave Technology*, vol. 7, No. 6, pp. 888–895 (1989).

(List continued on next page.)

*Primary Examiner*—Leon Scott, Jr.
*Attorney, Agent, or Firm*—Leydig, Voit & Mayer, Ltd.

[57] ABSTRACT

Two solid state laser structures are provided which are optimized for multimode operation. The first laser structure has a plurality of normal incidence optically transmissive surfaces in the laser cavity. The most reflective one of those normal incidence surfaces is disposed at the optical center of the laser cavity. The gain medium is centered in the subcavity defined by a cavity mirror and the optical center. In the second laser structure, there are no normal incidence surface in the laser cavity, and the gain medium is disposed at the optical center of the laser cavity. The laser structures are employed to construct erbium glass lasers which are not only optimized for multimode operation but also have effective cooling of the gain medium and minimized thermal lensing effect.

25 Claims, 4 Drawing Sheets

OTHER PUBLICATIONS

Hanna et al., "A 1.54 μm Er Glass Laser Pumped By A 1.064 μm Nd: Yag Laser," *Optics Communications*, vol. 63, No. 6, pp. 417–420 (1987).

Holtom et al., "Design of a Birefringent Filter for High–Power Dye Lasers," *Journal of Quantum Electronics*, vol. QE–10, No. 8, pp. 577–579 (1974).

Hutchinson, "Diode Array–Pumped Er, Yb: Phosphate Glass Laser," *Appl. Phys. Lett.*, vol. 60, No. 12, pp. 1424–1426 (1992).

Laporta et al., "10 kHz–Linewidth Diode–Pumped Er : Yb : Glass Laser," *Electronics Letters*, vol. 28, No. 22, pp. 2067–2069 (1992).

Laporta et al., "Diode–Pumped CW Bulk Er : Yb : Glass Laser," *Optics Letters*, vol. 16, No. 24, pp. 1952–1954 (1991).

Nazarathy et al., "Progress in Externally Modulated AM CATV Transmission Systems," *Journal of Lightwave Technology*, vol. 11, No. 1, pp. 82–105 (1993).

Snitzer et al., "13M–3 Phosphate Glass $Er^{3+}$ Laser, E.," *IEEE Journal of Quantum Electronics*, pp. 360–361 (1968).

Snitzer et al., "$Yb^{3+}$–$Er^{3+}$ Glass Laser," *Applied Physics Letters*, vol. 6, No. 3, pp. 45–46 (1965).

Wallmeroth, "Monolithic Integrated Nd:YAG Laser," *Optics Letters*, vol. 15, No. 16, pp. 903–905 (1990).

Conference, entitled, "QE–7 Erbium Phosphate Laser Glass," Kigre, Inc., Hilton Head, S.C., pp. 14–15 No Date Available.

Printed Agenda and Abstract of Oral Presentation, Naval Postgraduate School, Session Four—Link Demonstrations, Jan. 19, 1995, entitled "Advances in 1.3 and 1.55 μm Diode Pumped Solid State Lasers for Wide Dynamic Range Links," by Timothy C. Munks, including Photocopies of Transparencies used with the Oral Presentation.

SOLID STATE LASER OPTIMIZED FOR MULTIMODE OPERATION

FIELD OF THE INVENTION

The present invention relates generally to lasers, and more particularly to lasers using solid state gain materials to generate laser waves.

BACKGROUND OF THE INVENTION

It has been known for more than 30 years that glasses doped with erbium ions can operate as lasers (see, e.g., E. Snitzer & R. F. Woodcock, "$Yb^3+$—$Er^3+$ Glass Laser," Appl. Phys. Lett. 6, 45 (1965)). Early work on erbium glass lasers used silicate glasses and incorporated ytterbium ions as a sensitizer that would absorb pump energy and transfer it to the erbium ions. Within a few years, however, it was shown that phosphate glass was a significantly better material for this ytterbium sensitized erbium laser system (see, E. Snitzer, R. F. Woodcock & J. Segre, "Phosphate Glass $Er^3+$Laser," IEEE J. Quantum Electronics 4, 360, (1968)). Subsequent work with other glasses and crystals demonstrated that, because of its phonon energies, phosphate glass is a uniquely efficient host material for this laser system (see, e.g., V. P. Gapontsev et al., "Erbium Glass Lasers and Their Applications," Opt. Laser Technol., 189 (1982)).

A laser using ytterbium-sensitized erbium-doped phosphate glass as the gain medium can be pumped with different types of pump sources. Ytterbium in phosphate glass has a trivalent bonding state, and has a broad absorption peak stretching from 800 nm to 1100 nm, with a peak at 975 nm. Well established pump sources include InGaAs laser diodes generating wavelengths between 940 nm and 990 nm, and neodymium lasers generating wavelengths between 1040 nm and 1080 nm. U.S. Pat. No. 3,582,820 to Snitzer discusses intracavity pumping of such a laser with neodymium lasers. End pumping with a neodymium laser has been discussed in detail by D. Hanna, et al., in Optics Commun. 63, 417 (1987). A compact intracavity pumped erbium laser has been described by D. W. Anthon & T. J. Pier, in "Diode Pumped Erbium Glass Lasers," Solid State Lasers III, Gregory J. Quarles, Editor, Proc. SPIE 1627, 8–12 (1992). Pumping with laser diodes in the 940 nm to 990 nm region has been used in a side-pumped configuration by J. A. Hutchinson & T. H. Allik, in "Diode Array Pumped Er,Yb: Phosphate Glass Laser," Appl. Phys. Lett. 60, 1424–6 (1992), and in an end pumped geometry by P. Laporta et al., in "Diode Pumped CW Bulk Er:Yb:Glass Laser," Optics. Lett. 16, 1952 (1991).

Recent interest in erbium glass lasers comes from the desire to produce a suitable laser source for externally modulated CATV transmission systems. In a CATV system, analog optical signals are transmitted through optical fibers. Nd:YAG lasers operating at the wavelength of 1318 nm have been shown to be acceptable sources, and much of the experience with the CATV technology has been achieved using these devices. Nevertheless, it is highly desirable to provide a suitable laser source that operates at 1550 nm wavelength. This is because a typical fused silica optical fiber has the lowest attenuation around that wavelength. The low attenuation allows an optical signal at that wavelength to be transmitted over a longer distance. Because the gain of erbium doped glass covers a range of wavelengths centered around 1550 nm, there is currently strong interest in developing suitable erbium glass lasers to transmit CATV signals.

There are, however, numerous requirements for a laser used in such an application. For example, optimal operation of a CATV transmitter requires a laser with a relatively high optical power (typically greater than 100 mW into an optical fiber), very low relative intensity noise (RIN) (typically less than −160 dB/Hz) between 10 MHz and 1000 MHz, and an output spectrum that is consistent with minimized noises associated with dispersion, stimulated Brillouin scattering (SBS) and phase noise.

One way to minimize stimulated Brillouin scattering (SBS), which is one of the main sources of noises in signal transmission through an optical fiber, is to use a laser source that operates in multiple modes, where the spacing between those modes is more than twice the highest frequency in the system. With such mode spacing, the noise associated with mode beating does not appear in the signal band.

In a multimode laser, the output power is distributed in several spectral modes instead of being concentrated in one single mode, which is useful with respect to the suppression of SBS. The mode spacing in a typical neodymium or erbium laser is large with respect to the 100 MHz Brillouin linewidth. As a result, the individual modes act independently with respect to the onset of SBS (see, e.g., Y. Aoki and K. Tajima, "Stimulated Brillouin scattering in a long single-mode fiber excited with a multimode pump laser," J. Optical Society B 5(2), 358–363 (1988)).

The threshold for SBS is determined by the power carried in the most intense laser mode. By spreading the power over multiple spectral modes, the power in each mode can be kept below the SBS threshold, thereby suppressing noise caused by SBS. In this way, the power that can be transmitted through the fiber without significant SBS-related noise is increased. This is important for long distance analog transmission systems such as CATV, where signal-to-noise considerations dictate the use of relatively high power laser sources.

Besides the advantage of suppressed SBS, a laser source that operates in multiple spectral modes has the further advantage of improved stability of operation. Multi-longitudinal mode operation is often more stable than single frequency operation. Single frequency lasers are particularly unstable in the vicinity of a mode hop, and external perturbations can cause mode hops that drastically change the properties of a single frequency laser. The effect of mode hoping on the quality of the output of a diode-pumped laser can be seen if the output power of the laser is plotted as a function of the current flowing into the pump diode. In particular, the output power versus diode current (L-I) curve of a single-mode laser often exhibits steps or dips near mode hops. Multimode lasers are less prone to sudden mode changes and, as a result, produce relatively smooth L-I curves.

The number of modes in the output of a laser can sometimes be increased by broadening the bandwidth of the laser, which can further enhance suppression of SBS. This approach, however, is not always applicable because the acceptable bandwidth of a laser is often dictated by the application in which the laser is used. For example, in the CATV application, the upper limit on the useful laser bandwidth is determined by dispersion in the optical fiber, and is inversely proportional to the signal bandwidth, the fiber length and the group velocity dispersion. The dispersion of a typical single mode fiber at the wavelength of 1318 nm, where the optical fiber has the lowest dispersion, is less than 2 ps/(nm km). At 1550 nm, the dispersion is approximately 10 times that value. At the wavelength of 1318 nm, a typical allowable bandwidth is less than 20 nm, and probably closer to five (5) nm. A 20 nm bandwidth is too large for CATV systems as can be seen from the problems reported by M. Nazarathy, J. Berger et al. in "Progress in Externally Modulated AM CATV Transmission Systems," J. Lightwave Technology 11(1), 82–105 (1993), where "dual line" (1318+1338 nm) Nd:YAG lasers were used in CATV systems. A five (5) nm dispersion limit at 1318 nm corresponds roughly to a bandwidth of 800 GHz. Such a bandwidth is much larger than the cavity mode spacing of a typical Nd:YAG laser, which is on the order of 10 GHz. It is therefore possible to operate a Nd:YAG laser with a high number of output modes within such a bandwidth even though not all available cavity modes will be excited.

On the other hand, the dispersion-limited bandwidth at 1550 nm wavelength is much narrower than that at 1318 nm. Because the dispersion at 1550 nm is about ten times higher than that at 1318 nm, a five (5) nm dispersion limit at 1318 nm would become 0.5 nm at 1550 nm, which corresponds to a bandwidth about 60 GHz. The cavity mode spacing of a typical erbium laser is in the six (6) to ten (10) GHz range, which means there will be at most six to ten available cavity modes in the desired bandwidth. Such a small number of available cavity modes makes it extremely difficult to achieve multimode operation in an erbium laser and results in the laser having a strong tendency to operate in a single mode when the bandwidth is narrowed to about 60 GHz.

Some other difficulties encountered in developing a suitable erbium laser for CATV application are related to the relatively poor thermal and physical properties of erbium glass. An erbium laser for CATV application has to be able to provide an output power on the order of 150 mW. Due to the poor thermal conductivity of phosphate glass—the host material for the erbium ions—operating the erbium laser at such a high power (e.g., 150 mW) can produce a significant heat load on the gain medium. The heating problem is often exacerbated by the fact the gain medium in a erbium laser, which is a three level laser, is often short in length in order to minimize reabsorption losses. In such a case, the heat load in the erbium-doped phosphate glass is concentrated in a relatively small volume and can cause severe damage to the glass, such as local surface melting and fracture. The heat load in the glass can also cause thermal lensing, which degrades the quality and power of the laser output.

SUMMARY OF THE INVENTION

Accordingly, it is a general object of the present invention to provide a laser structure for solid state lasers that is optimized for multimode operation.

It is a related general object of the present invention to provide a solid-state laser optimized for multimode operation and which effectively cools the gain medium.

It is a more specific object of the present invention to provide a solid state structure for an erbium laser that allows the erbium laser to generate a laser wave with multiple modes within a bandwidth suitable for optical signal transmission. It is a related and more particular object of the invention to provide an erbium laser that has stable multimode operation within a bandwidth acceptable for CATV applications.

It is a further object of the present invention to provide an erbium laser whose structure is optimized for multimode operation and can be pumped by either a diode or a neodymium laser.

It is yet another object of the present invention to provide an erbium glass laser optimized for multimode operation and capable of providing high output power without damaging the gain medium and without a significant thermal lensing effect.

In accordance with these and other objects of the invention, a solid state gain medium is positioned within the resonant cavity of a laser in a manner that optimizes a multimode operation of the laser. The gain medium in the laser cavity has one of two possible positions in the cavity depending on the overall structure of the laser cavity. In the first position, a plurality of optically transmissive surfaces are disposed within the laser cavity and aligned to be normal to the optical path. The surface having the highest reflectivity at the laser wavelength is positioned at the optical center of the cavity. The gain medium is centered on the optical path midway between an input mirror and the optical center of the laser cavity. This arrangement controls the etalon effect in the laser cavity and the spatial hole burning effect in the gain medium to optimize the laser cavity for multimode operation. In the alternative, there is no optically transmissive surface in the cavity disposed normal to the optical path. For this type of solid state laser the gain medium is centered on the optical path at the optical center of the laser cavity. This arrangement controls the spatial hole burning effect in the gain medium to optimize the laser cavity for multimode operation.

The solid state laser system generates a laser wave having multiple modes about a desired laser wavelength. Due to the optimized multimode operation, the laser can be advantageously used in many optical communication applications that require stable laser output and low SBS related noise. For example, using erbium-doped phosphate glass at the gain medium, the laser generates the desirable wave length for the CATV application with multiple modes within the bandwidth acceptable for such an application. The stable operation and low noise resulted from the multimode operation can significantly enhance the quality of the optical signals transmitted with the laser output.

Other objects and advantages will become apparent from the following detailed description when taken in conjunction with the drawings, in which:

DETAILED DESCRIPTION OF THE PREFERRED EMBODIMENT

While the invention will be described in connection with certain preferred embodiments, there is no intent to limit it to those embodiments. On the contrary, the intent is to cover all alternatives, modifications, and equivalents included within the spirit and scope of the invention as defined by the appended claims.

Figure 1:
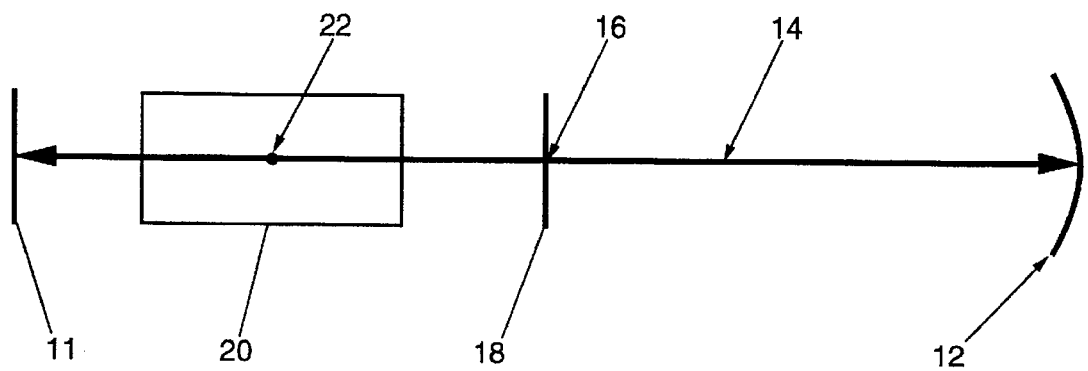
FIG. 1 is a highly schematic view of a laser cavity which has at least one normal incidence intracavity surface and has a laser structure optimized for multimode operation.
Figure 2:
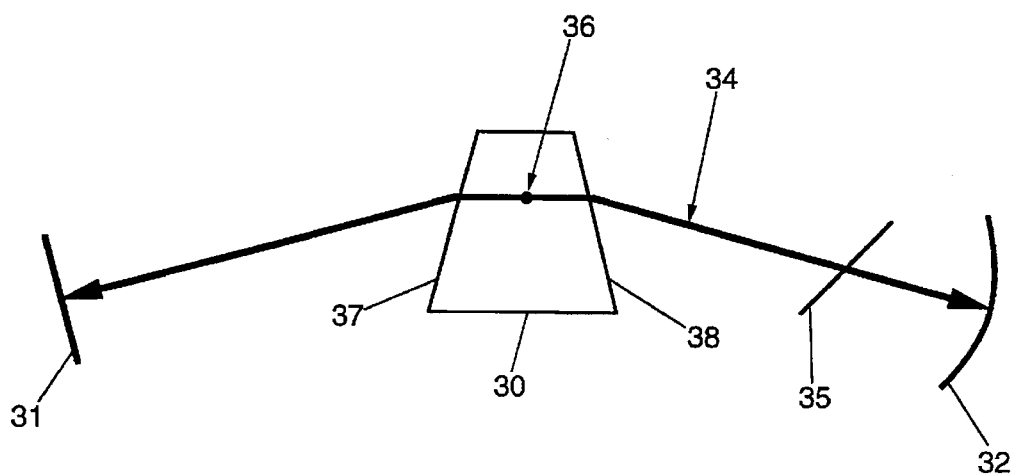
FIG. 2 is a highly schematic view of a laser cavity with no intracavity normal incidence surface which has a laser structure optimized for multimode operation.

Turning now to the drawings, FIGS. 1 and 2 illustrate two different solid state laser structures according to the teaching of the present invention which are both optimized for multimode operation. The choice between the two solid state laser structures depends on whether there are optically transmissive surfaces in the laser cavity which are disposed normal to the optical path of the circulating laser field in the laser cavity. If there is at least one such surface in the laser cavity, then the structure shown in FIG. 1 is employed. On the other hand, if there is no normal-incident surface in the laser cavity, then the structure in FIG. 2 is more advantageous for multimode operation.

FIG. 1 shows, in a highly schematic form, a laser having a laser structure optimized for multimode operation. The laser has a laser cavity defined by a first mirror 11 and a second mirror 12. A quantity of solid state gain medium 20 disposed in the cavity generates a circulating laser field inside the cavity. The laser cavity has an optical path 14 along which the circulating laser field travels, and an optical center 16 on the optical path 14. The laser in FIG. 1 may have one or more optically transmissive surfaces in the laser cavity which are disposed normal to the optical path 14 of the intracavity circulating laser field. Such surfaces are hereafter also referred to as normal incidence surfaces because the circulating laser field in the cavity travels through each of those surfaces at a normal incidence angle.

According to the teaching of the present invention, the surface 18 which has the highest reflectivity at the laser wavelength among those optically transmissive surfaces is disposed at the optical center 16 of the laser cavity. For simplicity of illustration, only three normal incidence surfaces, including the most reflective normal-incidence surface 18 and the two surfaces of the gain medium 20, are shown in FIG. 1. It will be appreciated, however, there may be other normal incidence surface in the cavity which are less reflective than the surface 18 at the optical center 16. If there is only one normal incident surface in the laser cavity, then that surface will be disposed at the optical center 16. As will be described in greater detail below, positioning the most reflective normal incident surface 18 at the optical center 16 allows the excitation of every other cavity mode. To further optimize multimode operation, the gain medium 20 is positioned in the subcavity defined by the first mirror 11 and the most reflective surface 18 at the optical center 16 in such a way that the center of active region 22 in the gain medium 20 is on the optical path 14 and midway between the first mirror 11 and the optical center 16.

In a solid state laser having no normal-incidence surface within its laser cavity, the laser structure illustrated in FIG. 2 can be used to optimize multimode operation. The laser cavity in FIG. 2 is defined by the mirrors 31 and 32. The center of an active region of the gain medium 30 is positioned at the optical center 36 of the laser cavity. In order to avoid having any normal-incidence surface in the laser cavity, the gain medium 30 in FIG. 2 has two non-parallel surfaces 37 and 38 which form oblique incidence angles with the optical path 34. The laser cavity may have other optically transmissive surfaces which are not normal to the optical path 34. For example, FIG. 2 shows a surface 35 which forms an oblique incidence angle with the optical path 34. Such a surface may be, for example, a surface of a Brewster angle birefringent filter disposed in the laser cavity for wavelength selection.

The two laser structures illustrated in FIGS. 1 and 2 are optimized to control two mode selection effects which are generally responsible for the excitation of only certain selected cavity modes, instead of all possible cavity modes, in the laser cavity of a solid state laser. The first mode selection effect is the etalon effect associated with normal incidence surfaces in the laser cavity, and the second mode selection effect is the spatial burning effect.

Turning first to the etalon effect, a reflective normal-incidence surface in a laser cavity has the effect of dividing the laser cavity into subcavities, and the electric field continuity condition at that reflective surface affects the standing wave magnitudes of different modes in the gain medium. Since the gain of each mode depends on its standing wave magnitude in the gain medium 40, those modes with higher standing wave magnitudes in the gain medium tend be excited at the expense of other modes. If more than one normal incidence reflective surface is present in the laser cavity, the analysis is more complex, and the relative phases of all the reflections need to be considered. However, if one of the reflective surfaces has a much greater reflectivity than the other surfaces, the same analysis used here remains generally valid.

Figure 3:
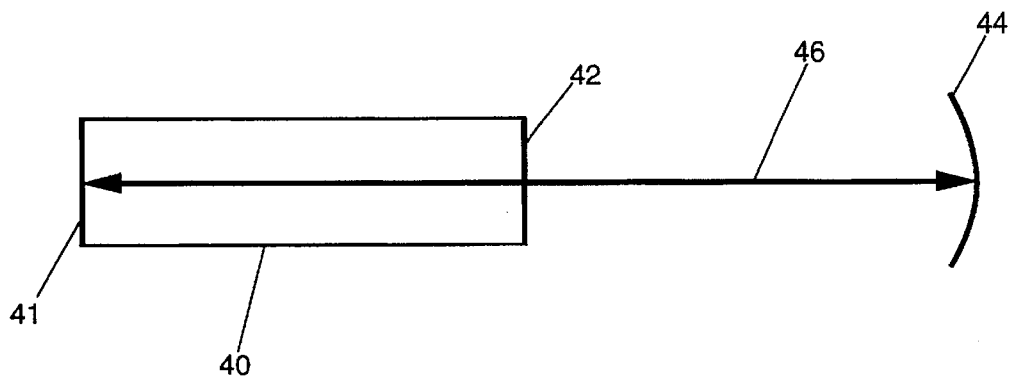
FIG. 3 is a highly schematic view of a laser cavity having a discontinuity of index of refraction at an interface surface inside the laser cavity.

In order to illustrate mode selection resulting from the etalon effect, FIG. 3 illustrates a simplified model of a solid state laser whose linear laser cavity includes an uncoated surface 42 at the second end of the gain medium 40 that is normal to the optical path 46 of the circulating laser field generated by the gain medium 40. The laser cavity is defined by an input mirror 41 disposed on one end of the gain medium 40, and an output mirror 44 which provides the output coupling. In this illustrated example, the optical length of the gain medium 40 is made to be one half of the total optical length in the laser cavity, and the index of refraction of the gain medium 40 is assumed to be 1.5. Thus there is a discontinuity of index of refraction at the surface 42 of the gain medium 40. This index discontinuity corresponds to a four (4) percent reflector that effectively divides the laser cavity into two subcavities. The different possible cavity modes of the laser corresponds to different standing waves in the laser cavity. The output power of a mode depends on its standing wave magnitude in the subcavity next to the output coupler 44, but the energy extraction (i.e., the gain) of that mode depends on its standing wave magnitude in the gain medium 40. The relative magnitudes of standing waves corresponding to different cavity modes will be determined by the condition of electromagnetic field continuity at the interface surface between the two subcavities, which is the surface 42.

Figure 4A:
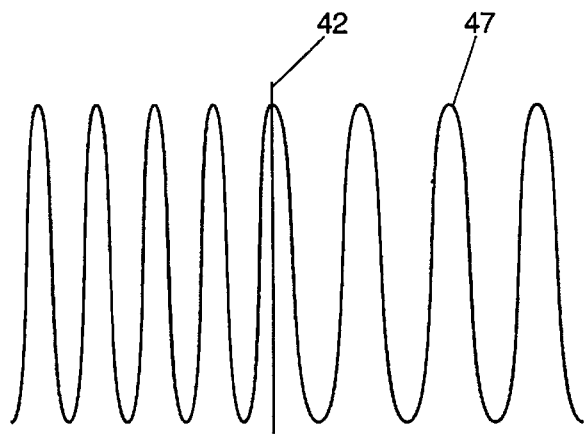
FIG. 4A shows the standing wave magnitude of a laser mode in the vicinity of the interface surface in the laser cavity of FIG. 3, the laser mode having a standing wave maximum at the interface surface.
Figure 4B:
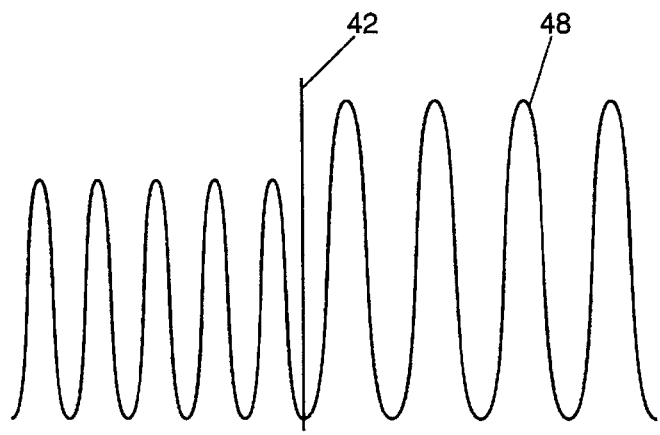
FIG. 4B shows the standing wave magnitude of a second laser mode in the vicinity of the interface surface in the laser cavity of FIG. 3, the laser mode having a standing wave minimum at the interface surface.

The magnitudes of two standing waves corresponding to two different laser modes in the vicinity of the surface 42 in the laser cavity are shown in FIGS. 4A and 4B. The standing wave 47 in FIG. 4A has a standing wave maximum at the interface surface 42, while the standing wave 48 in FIG. 4B has a standing wave minimum at the interface surface 42. Those familiar with lasers will appreciate that a mode with a standing-wave maximum at the interface surface 42 will have a higher standing-wave amplitude, and therefore a higher gain, in the gain medium 40. Such modes are, therefore, much more likely to be excited than other modes.

The variation in gain with standing wave pattern is not restricted to the specific configuration shown in FIG. 3. In fact, if the optical length of laser cavity is any integral multiple of the optical length of the gain medium, then standing waves like those in FIG. 4A, with maxima at the interface surface will exist, and furthermore these modes will have higher gain than the other modes in the cavity. Describing the standing wave patterns for lower gain modes that do not have extrema at the interface is complicated by the phase shifts that occur at the interface. However, it is generally true that increasing the standing wave amplitude at the interface will also increase the gain, and that a maximum at the interface will maximize the gain.

As mentioned above, the length of the optical path 46 (FIG. 3) in the gain medium 40 is set to be one half of the total optical length in the laser cavity. As a result, every second cavity mode has a standing wave maximum at the interface surface 42, and such a mode is more likely to appear in the spectrum of the laser output than other modes which do not have a standing wave maximum at the interface surface 42. This leads to a spectrum where the mode spacing is given by the free spectral range of the gain medium 40, instead of that of the laser cavity.

This example described above illustrates that, due to the etalon effect, the existence of a normal incidence in the laser cavity increases the mode spacing between the laser modes that are likely to be excited in the laser cavity. This has the effect of reducing the number of modes within a given bandwidth. Because the spacing of the laser modes selected depends on the location of the normal-incidence surface in the laser cavity, proper placement of the normal-incidence surface in the laser cavity is important to achieve optimal multimode operation.

Besides the etalon effect described above, the spatial hole burning effect also affects mode selection. A single standing wave in the laser activity leaves spots of unextracted gain in the gain medium. Such unextracted gain tends to drive the laser into multimode operation. Not all possible cavity modes will be selected by the spatial hole burning effect, however. First of all, which modes are available will depend on the etalon effect described above. Second, among the available modes, the modes that are more likely to operate due to the spatial hole burning effect will be those whose sum gives the most nearly uniform extraction efficiency in the gain medium.

Figure 5A:
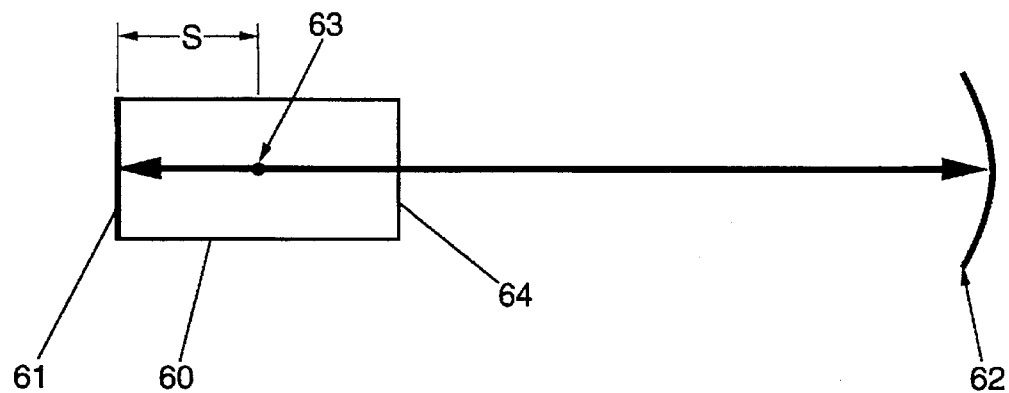
FIG. 5A is a schematic view of a laser with the center of the gain medium disposed at a distance S from an end mirror of the cavity.

The modes required to produce such a sum depends on the size and location of the gain medium. Such dependence is now illustrated using FIGS. 5A and 5B. FIG. 5A shows a laser cavity defined by two mirrors 61 and 62. In order to simplify the description of the mode selection effect of spatial hole burning, it is assumed that the etalon effect is negligible in the laser cavity in FIG. 5A. The center of active region 63 (hereafter "center") of the gain medium 60 in that cavity is positioned at a distance S away from the mirror 61. At the center 63 of the gain medium 60, modes spaced by a frequency $c/(4S)$ will have alternating minima and maxima at this point. If the gain medium 60 is very short, then only two out-of-phase oscillating modes will be required to produce a sum which has a nearly uniform intensity in the gain medium 60. If the length of the gain medium 60 is increased, then more wave modes will be required to produce a sum that is nearly uniform over the increased length to achieve efficient extraction. If $c/(4S)$ is an integral multiple of the cavity mode separation, then a comb of evenly spaced modes occurs; if not, some more ragged pattern approximating evenly spaced modes will result. In general, increasing the length of the gain medium 60 tends to increase the number of oscillating modes selected by the spatial hole burning effect.

If the laser has the gain medium 60 adjacent to a cavity mirror 61, as is the case in FIG. 5A, then S equals half the optical path length in the gain medium 60 and the laser will operate in modes spaced by the free spectral range of the gain medium 60. Note that this is exactly the same mode selection condition that occurs due to the etalon effects described above. The two effects in this case tend to reinforce each other so it can be difficult to distinguish these two effects.

Figure 5B:
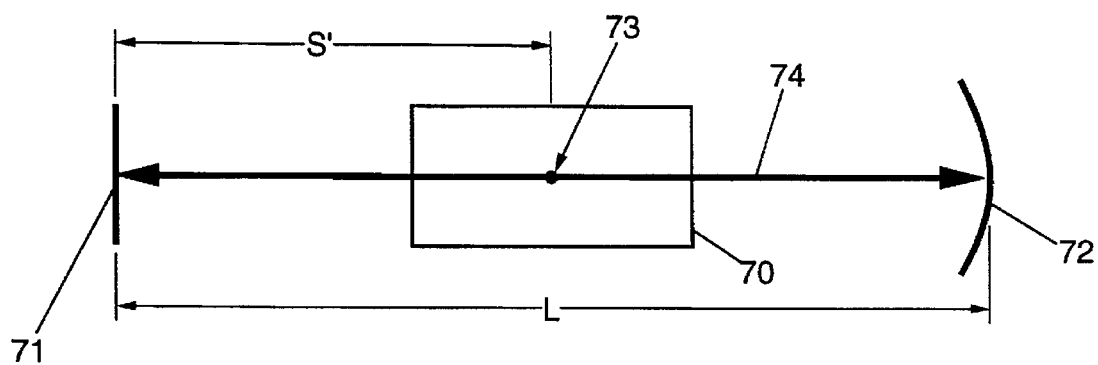
FIG. 5B is a schematic view of a laser with the gain medium disposed at the optical center of the laser cavity.

Other gain medium configurations produce different selection rules. For example, the center 73 of the gain medium 70 in the laser shown in FIG. 5B is positioned at the optical center of the laser cavity defined by mirrors 71 and 72. In this case the optical distance S' between the center 73 of the gain medium 70 and a mirror 71 or 72 is equal to half of the cavity optical length L. Thus modes separated by $c/4S'=c/2L$, which is the cavity mode spacing, will have alternate maximum and minimum at the center 73 of the gain medium 70. This tends to produce laser operation with immediately adjacent cavity modes. Similarly, placing the gain medium at a distance equal to one quarter of the total optical length in the cavity from a cavity mirror will tend to encourage operation in every other cavity mode. Those familiar with lasers will appreciate that moving the gain medium towards the optical center of the laser cavity will decrease the mode spacing between modes selected by spatial hole burning while increasing the length of the gain medium will tend to increase the total number of modes selected.

The modes which ultimately appear in the output wave of a laser will be the result of the combined mode selection effects of the etalon effect and the spatial hole burning effect. Returning now to FIG. 1, according to the teaching of the present invention, if there are normal-incidence surfaces in the laser cavity, then the most reflective of those surfaces will be placed at the optical center 16 of the laser cavity. As explained above, such a placement encourages the excitation of every other cavity mode due to the etalon effect. In order to enhance the excitation of those modes selected by the etalon effect, the gain medium 20 is centered in the subcavity defined by the first mirror 16 and the most reflective surface 18. In this way the mode spacing determined by the spatial hole burning effect will be the same as the mode spacing determined by the etalon effect. In other words, the spatial hole burning effect does not further reduce the number of modes by imposing a different mode spacing selection rule.

Figure 6:
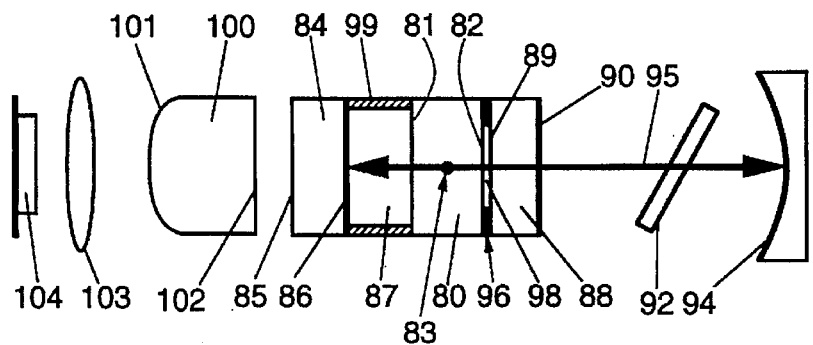
FIG. 6 is a schematic view of an embodiment of an erbium laser optimized for multimode operation.
Figure 7:
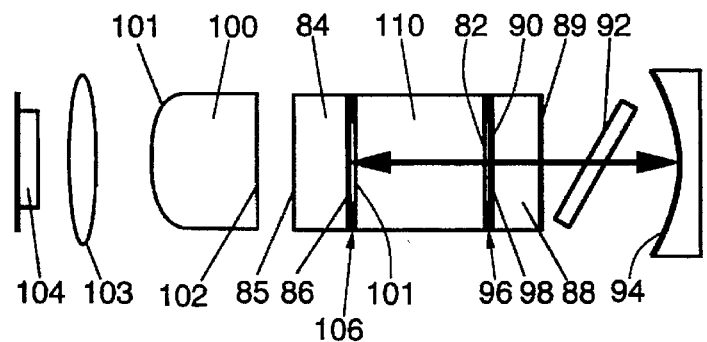
FIG. 7 is a schematic view of another embodiment of an erbium laser having a piece of gain medium which is thicker than that of the laser shown in FIG. 6.
Figure 8:
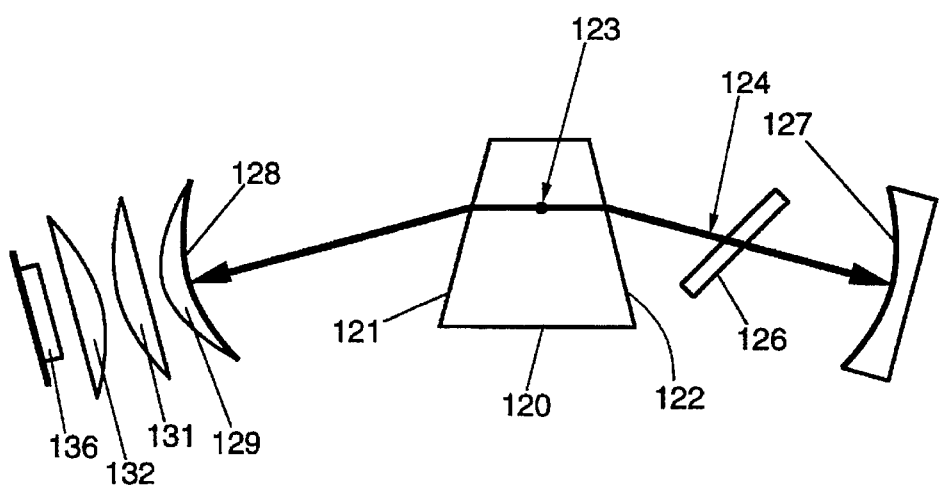
FIG. 8 is a schematic view of an embodiment of an erbium laser constructed according to the present invention which has no normal incidence surface in the laser cavity.

In FIGS. 6-8, the laser architectures shown in FIGS. 1 and 2 are incorporated into embodiments of erbium lasers. Those skilled in the art of lasers will appreciate, however, that the laser structures according to the teaching of the present invention are not limited to erbium lasers, but can be advantageously used to construct lasers using other types of gain materials—e.g., $Nd:YVO_4$, $Nd:Y_3Al_5O_{12}$, $Nd:YLiF_4$, $Cr:LiCaAlF_6$.

A preferred embodiment of the present invention using the laser structure illustrated in FIG. 1 is shown in FIG. 6. The laser in FIG. 6 is an erbium laser for generating an output wave with a wavelength around 1550 nm. Ytterbium sensitized erbium doped phosphate glass (type QE7) manufactured by Kigre Co. in Hilton Head, S.C., is used as the gain medium 80 which has an erbium concentration of approximately 0.5 percent by weight and a ytterbium concentration of approximately 12 percent by weight. Similar glasses are available from several other suppliers. The gain medium 80 in this embodiment has a thickness of 2.5 mm. The two surfaces 81 and 82 of the gain medium 80 are parallel to each other and are antireflection (AR) coated for 1064 nm and the range between 1530 nm and 1570 nm.

The laser cavity of the erbium laser is defined by a flat input mirror 86 and a curved output coupler 94. The length of the optical path 95 in this laser cavity is such that the cavity mode spacing is about 6.5 GHz. The reflectivity of the output coupler 94 at the erbium laser wavelength is typically set at 97 percent, although values from 85 percent to 99.9 percent have been used. The radius of the output coupler 94 is chosen to give a transverse mode radius of between 50 μm and 80 μm in the gain medium 80. The input mirror 86 is a surface of a crystal quartz plate 84 and is coated to be highly reflective in the region between 1530 nm and 1570 nm, and has a reflectivity higher than 90 percent at 1064 nm. The other surface 85 of the crystal quartz plate 84 is antireflection (AR) coated for 1064 nm wavelength. The crystal quartz plate 84 is separated from the gain medium 80 by a spacer 99.

In the embodiment shown in FIG. 6, a normal incidence birefringent filter is used in the laser to select the wavelength of the erbium laser and to control its bandwidth. Using a normal incidence birefringent filter has the advantage that the wavelength selected is largely insensitive to small vibrations that may exist in the environment in which the laser is used. The normal incidence birefringent filter comprises a normal incidence wave plate 88 and a Brewster polarizer 92. One surface 89 of the wave plate 88 is AR coated for 1064 nm and the range between 1530 nm and 1570 nm. The other surface 90 of the wave plate 88 is coated to be highly reflective at 1064 nm and less than 10 percent reflective in the region between 1530 nm and 1570 nm. As will be described in greater detail below, this surface 90 serves as a cavity mirror of the neodymium laser used for intracavity pumping the erbium laser.

The wave plate 88 is made of crystal quartz and is located with its optic axis perpendicular to the optical path 95, and at an angle of 45 degrees from the plane of incidence of the Brewster polarizer 92. This arrangement provides a low-loss condition for any wavelength for which the wave plate 88 is a full-wave or half-wave plate, and such a wavelength selected as the wavelength of the erbium laser. The wavelength selected depends entirely on the thickness and temperature of the wave plate 88. The bandwidth of the normal incidence birefringent filter is inversely proportional to the thickness and birefringence of the wave plate 88. Using well established fabrication techniques, it is possible to obtain full-wave plates or half-wave plates at any desired wavelength (see, e.g., J. M. Bennett & H. E. Bennett, Handbook of Optics, Chapter 10, "Polarization", W. G. Driscoll, Editor, McGraw Hill (1978)).

Instead of using the normal incidence birefringent filter described above, the laser wavelength and bandwidth can also be controlled by using a birefringent plate placed at the Brewster angle. In such a case the Brewster polarizer 92 in FIG. 6 will be replaced by a birefringent Brewster plate, and the wave plate 88 will be replaced by a plate without the birefringent effect. The wavelength selection in this case is achieved by rotating the birefringent Brewster plate. This method of wavelength selection is somewhat less favorable from the point of view of stability because very small vibrational motions can cause appreciable frequency shifts.

The erbium glass laser in the embodiment shown in FIG. 6 is intracavity pumped by a neodymium laser using a Nd:YAG rod 100 as the gain medium. The Nd:YAG rod 100 has a curved surface 101 which is coated to be highly reflective at 1064 nm and highly transmissive at 808 nm. The other end surface 102 of the Nd:YAG rod 100 is AR coated for 1064 nm. The laser cavity of the neodymium laser is defined by the curved surface 101 of the Nd:YAG rod 100 and the surface 90 of the wave plate 88. The intracavity field of the neodymium laser is used to pump the glass gain medium 80. The Nd:YAG laser is in turn pumped by a laser diode 104 which emits radiation at 808 nm. The output of the laser diode 104 is focused into the Nd:YAG rod 100 by a spherical lens 103. The laser diode 104 used in this embodiment is model SDL-2370-C from Spectra Diode Laboratories, 80 Rose Orchard Way, San Jose, Calif. 95134.

Due to the presence of normal incidence surfaces in the laser cavity, the laser shown in FIG. 6 is configured according to the laser structure illustrated in FIG. 1 for optimized multimode operation. The optical elements inside the laser cavity include the erbium glass gain medium 80, the wave plate 88, and the brewster polarizer 92. The surfaces of the gain medium 80 and the wave plate 88 are all parallel to each other within ten arc seconds and are perpendicular to the optical path 95 in the laser cavity. Thus the surfaces 81, 82, 89 and 90 form normal incidence optically transmissive surfaces in the laser cavity. Among those surfaces, the surface 90 of the wave plate 88 is the most reflective at the erbium laser wavelength, with a reflectivity less than 10 percent. Because the reflectivity of the surface 90 is significantly higher than the reflectivities of the other normal incidence surfaces 81, 82 and 89, it is the primary source of the etalon effect in the cavity. The placement of the AR coated surfaces 81, 82 and 89 is much less important.

In accordance with the teaching of the present invention for optimized multimode operation, the surface 90 of the wave plate 88 is positioned at the optical center of the laser cavity. In other words, the length of the optical path 95 between the input mirror 86 and the surface 90 is set to be the same as that between the surface 90 and the output coupler 94. The position of the gain medium 80 in the subcavity defined by the input mirror 86 and the surface 90 is such that the center 83 of the erbium glass gain medium 80 is midway between the input mirror 86 and the surface 90. With such a configuration, the laser shown in FIG. 6 produces as many as four modes operating over a 0.4 nm bandwidth, and the number of modes rarely falls below two.

Besides being optimized for multimode operation, the laser in FIG. 6 is further configured to reduce the risk of heat damage and to minimize the thermal lensing effect. The risk of damaging the gain medium 80 by heating is significantly reduced by providing effective face cooling of the gain medium 80. In order to effectively conduct heat away from the surface 82 of the gain medium 80, the surface 82 of the gain medium 80 is separated from the wave plate 88 by a thin spacer 96. The thin air gap 98 formed by inserting the thin spacer 96 between the gain medium 80 and the wave plate 88 allows efficient heat transfer from the surface 82 to the wave plate 88, which has a significantly higher thermal conductivity than the erbium-doped phosphate glass gain medium 80. The spacer 96 in this embodiment is in the form of dielectric standoffs of about three (3) μm thick. Such dielectric standoffs can be deposited by conventional coating techniques, such as vacuum ion sputtering deposition, on either the gain medium 80 or the wave plate 88.

Leaving a small air gap between the gain medium 80 and the wave plate 88 also has the effect of minimizing thermal lensing caused by thermal expansion of the erbium-doped phosphate glass gain medium 80. Phosphate glasses have refractive indices that decrease with temperature. If a uniformly heated, AR coated piece of erbium-doped phosphate glass of length L is placed in a resonator of length $L_1$ and heated, the temperature dependence of the cavity frequency is given by the equation:

$$df/dT=(fnL/L1)\ ((1/n)(dn/dT)+(1-1/n)\alpha),$$

where f is the cavity frequency, n is the index of refraction of the erbium glass, T is the temperature of the erbium glass, and $\alpha$ is the thermal expansion coefficient of the erbium glass. For nonuniform heating, the thermal lensing effect is proportional to df/dT. Calculating df/dT based on the manufacturer's data for the QE-7 erbium glass used in the preferred embodiment gives $(1/n)(dn/dT)+(1-1/n)\alpha=-0.07$ ppm/K. If the same erbium glass is coated to be highly reflective on both sides to form a monolithic resonator with $L=L_1$, the temperature dependence is $df/dT=fn\ ((1/n)(dn/dT)+\alpha)$, and $(1/n)(dn/dT)+\alpha=7.3$ ppm/K for the QE-7 erbium glass. The reason for such a drastic difference in temperature dependence between the two cases is that in the former case the glass expansion is compensated by displacing air from the cavity to give a much smaller temperature dependence. Thus leaving appropriate air gaps in the laser system can greatly reduce the temperature dependence and thermal lensing. Accordingly, in the embodiment in FIG. 6 both surfaces 81 and 82 of the erbium glass gain medium 80 are AR coated and are separated from the plate 84 and the wave plate 88 by air gaps 87 and 98.

FIG. 7 shows another embodiment of an erbium laser having the laser structure illustrated in FIG. 1 for optimized multimode operation. The laser in FIG. 7 shares many optical components with the laser in FIG. 6, and those common optical components are labeled with the same reference numerals in FIGS. 6 and 7. The laser cavity in FIG. 7 is defined by a flat input mirror 86 and a curved output coupler 94. A normal incidence birefringent filter comprising a normal incidence wave plate 88 and a Brewster polarizer 92 is used to select the wavelength of the erbium laser and to control the its bandwidth. One surface 89 of the wave plate 88 is AR coated for the range between 1530 nm and 1570 nm. The other surface 90 of the wave plate 88 facing the erbium glass gain medium 110 is coated to be highly reflective at 1064 nm and less than 10 percent reflective in the region between 1530 nm and 1570 nm. This surface 90 is the most reflective normal incidence surface in the laser cavity shown in FIG. 7, and is positioned at the optical center of the laser cavity.

Like the laser in FIG. 1, the laser in FIG. 7 is also configured to provide effective face cooling and minimized thermal lensing effect. The two surfaces 111 and 112 of the erbium glass gain medium 110 are parallel to each other and are AR coated for 1064 nm and the range between 1530 nm and 1570 nm. The two surfaces of the erbium glass gain medium 110 are separated from the quartz plate 84 and the wave plate 88, respectively, by dielectric standoffs 96 and 106 about three (3) μm thick. This arrangement not only provides efficient face cooling for both surfaces 111 and 112 of the erbium glass gain medium 110 but also centers the erbium glass gain medium 110 in the subcavity defined by the input mirror 86 and the surface 90 of the wave plate 88.

The laser in FIG. 7 differs from that in FIG. 6 mainly in that the erbium glass gain medium 110 used in the laser in FIG. 7 is significantly thicker than the gain medium 80 in FIG. 6. As described above, increasing the thickness of the gain medium tends to increase the number of modes selected by the spatial hole burning effect. On the other hand, increasing the thickness of the gain medium will increase reabsorption losses. Because the same inversion density needs to be maintained over a longer distance, increasing the thickness of the gain medium raises the threshold and increases the demand on the beam quality of the pump laser. Preferably the thickness of the erbium glass gain medium 110 is in the range of five (5) mm to seven (7) mm. If significantly thicker erbium glass is to be used, then it may be necessary to reduce the erbium concentration in the glass to reduce reabsorption losses.

In the embodiments shown in FIG. 6 and FIG. 7, the laser structure illustrated in FIG. 1 is employed because there are normal-incidence surfaces in the laser cavities. If there is no normal-incidence surface in the laser cavity, then the laser structure illustrated in FIG. 2 can be advantageously used to achieve optimal multimode operation.

An erbium laser having such an structure is shown in FIG. 8. The laser cavity is defined by an input mirror 128 and an output coupler 127. The input mirror 128 is disposed on a surface of a lens 129. In order to eliminate normal incidence surfaces in the cavity so as to avoid the etalon effect, the erbium glass gain medium 120 is wedged so that its two surfaces 121 and 122 form oblique incidence angles with the optical path 124. For the same reason, a Brewster angle birefringent filter 126 is used, instead of the normal incidence birefringent filter shown in FIGS. 6 and 7, to control the wavelength and bandwidth of the laser wave generated. In accordance with the teaching of the present invention, the erbium glass gain medium 120 is positioned at the optical center 123 of the laser cavity. With the gain medium 120 at that position, the spatial hole burning effect tends to select modes separated by the cavity mode spacing of the laser cavity.

In this embodiment, the erbium laser is pumped directly by a laser diode 136 emitting a pump wave with a wavelength between 940 nm and 990 nm. A suitable laser diode, for example, is model SDL-6360-C from Spectra Diode Laboratories. Because of the high divergence of the output from the laser diode 136, large diameter optics which includes a cylindrical lens 132, a spherical lens 131, and the lens 129 are required to achieve the focal depth required to reach the gain medium 120 at the center 123 of the laser cavity. This diode pumping scheme can also be used to pump the lasers shown in FIGS. 6 and 7 in place of the neodymium laser.

It will be appreciated now that what has been provided are solid state laser structures optimized for multimode operation. Such structures are advantageously used to construct erbium glass lasers which operate in multiple modes within the dispersion-limited bandwidth suitable for CATV operations. In accordance with a feature of the present invention, a normal incidence birefringent filter is used in the laser structure with intracavity normal incidence surfaces. The normal incidence birefringent filter not only provides stable wavelength selection but is also used to provide effective face cooling of the gain medium and, at the same time, reduced thermal lensing effect.

What is claimed is:

1. A solid state laser for generating a laser wave having multiple of modes about a desired laser wavelength, the laser system comprising: a pump source for generating a pump wave, an input mirror and an output coupler defining a laser cavity, the input mirror transmitting a pump wave into the laser cavity, the laser cavity having an optical path and an optical center therein, the laser cavity having at least one optically transmissive surface disposed at the optical center of the laser cavity such that the number of selected modes in the laser cavity is maximized, said at least one optically transmissive surface having a highest reflectivity of optical elements disposed within the laser cavity and normal to the optical path; and a solid state gain medium absorbing the pump wave and generating the laser wave which travels along the optical path in the laser cavity, the output coupler transmitting a portion of the laser wave out of the laser system, the gain medium having an active region whose center is disposed on the optical path midway between the input mirror and the said at least one optically transmissive surface, thereby optimizing multimode operation of the laser cavity.

2. The solid state laser of claim 1, wherein the gain medium is erbium doped phosphate glass.

3. The solid state laser of claim 2, wherein the gain medium is erbium doped phosphate glass sensitized with ytterbium ions.

4. The solid state laser of claim 3, wherein the pump source is a diode laser.

5. The solid state laser of claim 3, wherein the pump source is a neodymium laser.

6. The solid state laser of claim 5, wherein the neodymium laser is pumped by a diode laser.

7. The solid state laser of claim 1, wherein the gain medium has first and second surfaces which are antireflection coated for the laser wavelength, and wherein the laser cavity includes a first plate separated from the first surface of the gain medium by a first air gap.

8. The solid state laser of claim 7, wherein the first air gap is formed by disposing dielectric standoffs between the first plate and the first surface of the gain medium.

9. The solid state laser of claim 7, including a second plate separated from the second surface of the gain medium by a second air gap.

10. A solid state laser of claim 7 wherein the optically transmissive surface positioned at the optical center of the laser cavity is a first plate disposed between the gain medium and the output coupler and having a surface which is highly reflective for the pump wave.

11. The solid state laser of claim 1, including a normal incidence wave plate and a Brewster polarizer cooperating to select the laser wavelength.

12. The solid state laser of claim 11, wherein the optically transmissive surface disposed at the optical center of the laser cavity is a surface of the normal incidence wave plate, which is highly reflective for the pump wave.

13. The solid state laser of claim 11, wherein the wave plate is a full-wave plate at the laser wavelength.

14. The solid state laser of claim 11, wherein the wave plate is a half-wave plate at the laser wavelength.

15. The solid state laser of claim 11, wherein the wave plate is crystal quartz.

16. The solid state laser of claim 1, including a Brewster angle birefringent filter for wavelength selection.

17. A solid state laser system for generating a laser wave containing multiple modes about a desired laser wavelength, the laser system comprising: an input mirror and an output coupler defining a laser cavity, the laser cavity having an optical path therein and an optical center, the input mirror transmitting a pump wave into the laser cavity and the output coupler transmitting a portion of the laser wave out of the laser system, the laser cavity having no optically transmissive surface that is both (1) disposed between the input mirror and the output coupler and (2) normal to the optical path; and a solid state gain medium absorbing the pump wave and generating the laser wave, the gain medium having an active region whose center is disposed at the optical center of the laser, thereby optimizing multimode operation of the laser cavity.

18. The solid state laser of claim 17, wherein the gain medium is erbium-doped phosphate glass.

19. The solid state laser of claim 17, wherein the gain medium is erbium-doped phosphate glass having two non-parallel surfaces disposed in the optical path.

20. The solid state laser of claim 17, wherein the gain medium is erbium-doped phosphate glass sensitized with ytterbium ions.

21. The solid state laser of claim 20, wherein the pump source includes a diode laser.

22. A solid state laser for generating a laser wave having multiple modes about a desired laser wavelength, the solid state laser comprising: first and second mirrors defining a laser cavity having an optical path therein and an optical center, the laser cavity having at least one optically transmissive surface disposed at the optical center of the laser cavity such that the number of selected modes in the laser cavity is maximized, said at least one optically transmissive surface having a highest reflectivity of optical elements disposed within the laser cavity and normal to the optical path; a wave plate and a Brewster polarizer cooperating to select the laser wavelength, the wave plate being disposed normal to the optical path; and solid state gain medium for generating the laser wave, the gain medium having an active region whose center is disposed on the optical path midway between the first mirror and said at least one optically transmissive surface, thereby optimizing multimode operation of the laser cavity.

23. The solid state laser of claim 22, wherein the gain medium has first and second surfaces parallel to each other, and wherein the wave plate is disposed parallel to but separated from the first surface.

24. The solid state laser of claim 22, wherein the wave plate includes the optically transmissive surface disposed at the optical center of the laser cavity.

25. The laser as defined in claim 22, wherein the wave plate is quartz crystal.

* * * * *